United States Patent Office 2,919,227
Patented Dec. 29, 1959

2,919,227

SYNERGIST-CONTAINING POLYCYCLIC ALDEHYDES AND ALCOHOLS AS INSECT REPELLENTS

Lyle D. Goodhue and Kenneth E. Cantrel, Bartlesville, Okla., assignors to Phillips Petroleum Company, a corporation of Delaware No Drawing. Application November 9, 1954
Serial No. 467,882

5 Claims. (Cl. 167—33)

This invention relates to repellent compositions. In one aspect this invention relates to a method for repelling insects. In one aspect this invention relates to a defined class of N-alkyl imides as synergists for polycyclic aldehyde and alcohol insect repellents of a class defined hereinafter. In another aspect this invention relates to a method for improving activity of a class of polycyclic insect repellent compounds defined hereinafter by incorporating into such repellent compounds at least one of a defined class of N-alkyl imides. In still another aspect this invention relates to insect repellent materials containing as an essential active ingredient at least one of 2,3,4,5 - bis($\Delta^2$ - butenylene)tetrahydrofurfural, 2,3,4,5-bis(butylene)tetrahydrofurfural, 2,3,4,5 - bis($\Delta^2$ - butenylene)tetrahydrofurfuryl alcohol, and 2,3,4,5-bis(butylene)-tetrahydrofurfuryl alcohol, and certain derivatives thereof together with at least one of the class of N-alkyl imides of bicyclo[2.2.1]-5-heptene-2,3-dicarboxylic acid. In still another aspect this invention relates to a method for repelling insects by applying to a surface from which insects are to be repelled, a repellent, containing as an essential active ingredient at least one of 2,3,4,5-bis($\Delta^2$-butenylene)tetrahydrofurfural, 2,3,4,5-bis(butylene)tetrahydrofurfural, 2,3,4,5 - bis($\Delta^2$ - butenylene)tetrahydrofurfuryl alcohol, and 2,3,4,5-bis(butylene)tetrahydrofurfuryl alcohol, and a synergistic amount of at least one of the class of N-alkyl imides or bicyclo[2.2.1]-5-heptene-2,3-dicarboxylic acid. In still another aspect this invention relates to N-octyl bicyclo[2.2.1]-5-heptene-2,3-dicarboximide as a synergist for an insect repellent containing as an essential ingredient at least one of 2,3,4,5-bis($\Delta^2$-butenylene)tetrahydrofurfural, 2,3,4,5-bis(butylene)tetrahydrofurfural, 2,3,4,5-bis($\Delta^2$-butenylene)tetrahydrofurfuryl alcohol, and 2,3,4,5-bis(butylene)tetrahydrofurfuryl alcohol.

Other aspects, the objects, and advantages of this invention, are apparent from the disclosure and the appended claims.

Insects, such as roaches, flies and others, are troublesome pests in homes, restaurants, grocery stores and the like, especially in warm climates where out-of-door infestation is present all year.

The class of polycyclic aldehydes and alcohols, namely 2,3,4,5-bis($\Delta^2$-butenylene)tetrahydrofurfuryl alcohol, 2,3,4,5-bis(butylene)tetrahydrofurfural and 2,3,4,5-bis(butylene)tetrahydrofurfuryl alcohol, and certain derivatives of these compounds are effective insect repellents as disclosed and claimed in the copending application of Lyle D. Goodhue and James T. Edmonds, Serial No. 399,615, filed December 21, 1953, now Patent No. 2,795,526. Also, 2,3,4,5-bis($\Delta^2$-butenylene)tetrahydrofurfural and certain derivatives thereof are effective insect repellents as disclosed and claimed in U.S. Patent 2,572,577, Carolyn E. Tissol and Lyle D. Goodhue, issued October 23, 1951.

We have found that N-alkyl imides of bicyclo[2.2.1]-5-heptene-2,3-dicarboxylic acid exhibit a synergistic effect upon the repellent activity of the above-referred to polycyclic repellent materials.

In accordance with this invention are provided insect repellent compositions containing as an essential ingredient at least one polycyclic compound characterized by a structural formula of the groups I and II,

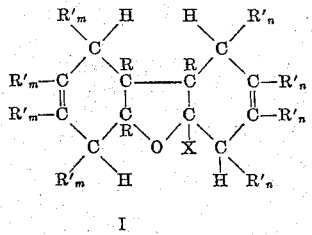

I and

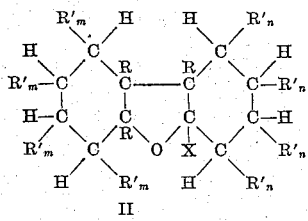

II wherein in each formula X is a radical of the group

and

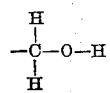

each R is a radical of the group of hydrogen and methyl, and at least one R is hydrogen, wherein each R' is a radical of the group of hydrogen and an alkyl containing not more than three carbon atoms, wherein the sum of the carbon atoms in the R'$_m$ and the R'$_n$ radicals is in each case not greater than three and wherein at least two of the R'$_m$ and at least two of the R'$_n$ radicals are hydrogen, together with a synergistic amount of at least one imide of the class of N-alkyl imides of bicyclo[2.2.1]-5-heptene-2,3-dicarboxylic acid represented by the formula

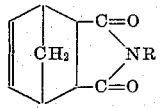

Also, in accordance with this invention is provided a method for repelling insects, comprising applying to a surface from which insects are to be repelled, a composition containing as an essential active ingredient at least one polycyclic compound characterized by a structural formula of the above defined Formulas I and II, and a synergistic amount of at least one N-alkyl imide of bicyclo[2.2.1]-5-heptene-2,3-dicarboxylic acid.

Still in accordance with this invention is provided a method for improving repellent activity of an insect repellent containing as an essential active ingredient at least one polycyclic compound characterized by a structural formula of the group of above defined Formulas I and II, comprising incorporating in said repellent, a synergistic amount of at least one N-alkyl imide of bicyclo[2.2.1]-5-heptene-2,3-dicarboxylic acid.

The N-alkyl imides synergists of this invention advantageously contain from one to twelve carbon atoms in the alkyl group, preferably from 4 to 10 carbon atoms.

We have found that N-alkyl imides of bicycle[2.2.1]-5-heptene-2,3-dicarboxylic acid, particularly those containing from one to twelve alkyl carbon atoms, exhibit a synergistic effect on the repellent activity of 2,3,4,5-bis($\Delta^2$-butenylene)tetrahydrofurfural and we have provided, therefore, a method for improving repellent activity of 2,3,4,5-bis($\Delta^2$-butenylene)tetrahydrofurfural by incorporating into that material an N-alkyl imide synergist of this invention, a method for utilizing resulting repellent compositions for repellence of insects, and resulting compositions.

Further, we have found that N-alkyl imides of bicyclo[2.2.1]-5-heptene-2,3-dicarboxylic acid, particularly those containing from one to twelve alkyl carbon atoms, exhibit a synergistic effect on the repellent activity of 2,3,4,5-bis(butylene)tetrahydrofurfural and we have provided, therefore, a method for improving repellent activity of 2,3,4,5-bis(butylene)tetrahydrofurfural by incorporating into that material an N-alkyl imide synergist of this invention, a method for utilizing resulting repellent compositions for repellence of insects, and resulting compositions.

Further, we have found that N-alkyl imides of bicyclo[2.2.1]-5-heptene-2,3-dicarboxylic acid, particularly those containing from one to twelve alkyl carbon atoms, exhibit a synergistic effect on the repellent activity of 2,3,4,5-bis($\Delta^2$-butenylene)tetrahydrofurfuryl alcohol and we have provided, therefore, a method for improving repellent activity of 2,3,4,5-bis($\Delta^2$-butenylene)tetrahydrofurfuryl alcohol by incorporating into that material an N-alkyl imide synergist of this invention, a method for utilizing resulting repellent compositions for repellence of insects, and resulting compositions.

Further, we have found that N-alkyl imides of bicyclo[2.2.1]-5-heptene-2,3-dicarboxylic acid, particularly those containing from one to twelve alkyl carbon atoms, exhibit a synergistic effect on the repellent activity of 2,3,4,5-bis(butylene)tetrahydrofurfuryl alcohol and we have provided, therefore, a method for improving repellent activity of 2,3,4,5-bis(butylene)tetrahydrofurfuryl alcohol by incorporating into that material an N-alkyl imide synergist of this invention, a method for utilizing resulting repellent compositions for repellence of insects, and resulting compositions.

It is a feature of this invention that when employing our synergized repellent compositions, the repellent and synergist components can be applied in admixture or separately to the surface to be treated, as desired.

We have measured the synergistic effect of the N-alkyl imides in accordance with this invention by the increase in the length of time during which the synergized repellents continue to repel insects. The N-alkyl imides of bicyclo[2.2.1]-5-heptene-2,3-dicarboxylic acid synergists of this invention can be represented by the structural formula

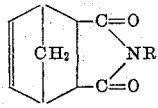

wherein R, preferably, is an alkyl radical containing from one to twelve carbon atoms, more preferably from 4 to 10 carbon atoms. A preferred imide repellent of this invention is that commercially available as MGK–264, which is N-octyl bicyclo[2.2.1]-5-heptene-2,3-dicarboximide, which can also be referred to as N-octyl bicycloheptenedicarboximide. Further exemplary of alkyl imide synergists of this invention are N-sec-hexyl bicyclo[2.2.1]-5-heptene-2,3-dicarboximide, N-n-heptyl bicyclo[2.2.1]-5-heptene-2,3-dicarboximide, N-t-dodecyl bicyclo[2.2.1]-5-heptene-2,3-dicarboximide, N-methyl bicyclo[2.2.1]-5-heptene-2,3-dicarboximide, N-t-butyl bicyclo[2.2.1]-5-heptene-2,3-dicarboximide, N-propyl bicyclo[2.2.1]-5-heptene-2,3-dicarboximide, N-n-decyl bicyclo[2.2.1]-5-heptene-2,3-dicarboximide and N-t-amyl bicyclo[2.2.1]-5-heptene-2,3-dicarboximide.

Further, exemplary of the polycyclic aldehyde and alcohol repellent materials, the activity of which is synergized by alkyl amides in accordance with this invention are 2,3,4,5-bis($\Delta^2$-2-methylbutenylene)tetrahydrofurfural, 2,3,4,5-bis(2,3-dimethylbutylene)tetrahydrofurfural, 2,3,4,5-bis(2-ethylbutylene)tetrahydrofurfural, 2,3($\Delta^2$-2-methylbutenylene)-4,5-($\Delta^2$-2-ethylbutenylene)tetrahydrofurfural, 2,3-(2,3-dimethylbutylene)-4,5-(2-methylbutylene)tetrahydrofurfural, 2,3,4,5-bis($\Delta^2$-2-methylbutenylene)tetrahydrofurfuryl alcohol, 2,3,4,5-bis(2-ethylbutylene)tetrahydrofurfuryl alcohol and 2,3-($\Delta^2$-butenylene)-4,5-($\Delta^2$-2-methylbutenylene)tetrahydrofurfuryl alcohol.

A method for the preparation of 2,3,4,5-bis($\Delta^2$-butenylene)tetrahydrofurfural and derivatives thereof, and such compounds per se, are disclosed and claimed in U.S. Patent 2,683,151, issued to John C. Hillyer and Daniel A. Nicewander, July 6, 1954. A method for preparation of 2,3,4,5-bis($\Delta^2$-butenylene)tetrahydrofurfuryl alcohol and certain derivatives thereof and compounds so produced, are disclosed and claimed in the copending application of John C. Hillyer, Serial No. 255,520, filed November 8, 1951, now Patent No. 2,687,419. A method for preparation of 2,3,4,5-bis(butylene)tetrahydrofurfuryl alcohol and 2,3,4,5-bis(butylene)tetrahydrofurfural and certain derivatives of these compounds, and compounds so produced, are disclosed and claimed in the copending application of John C. Hillyer, Serial No. 396,321, filed December 4, 1953, now Patent No. 2,795,592.

The control of stable flies is a particularly important problem on farms and ranches. The stable fly *Stomoxys calcitrans* (Linn.) is a bad pest of domestic animals, particularly of cattle and horses. The stable flies have long piercing mouth parts which they use to penetrate the skin of the animal and feed on the animal. They worry the animals continuously, and weaken them by sucking their blood. This results in great economic loss. In the case of dairy cows milk production diminishes markedly when the cows are bothered by large numbers of stable flies.

We have found that the synergized repellent compositions of this invention are especially effective as repellents of stable flies. That is to say that the synergist materials of this invention employed in conjunction with the polycyclic repellent materials provide for a marked increase in the length of time during which the said repellent materials continue to actively repel stable flies. When employing the compositions of this invention as stable fly repellents, they are applied either to the surface of the animal and/or to the nearby surface areas, such as the walls and stalls of barns. As illustrated with reference to the examples herein, the repellent materials of this invention are effective in repelling other insects, such as house flies, and when incorporated with a synergistic amount of an imide synergist of this invention, exhibit a marked increase in the length of time during which they continue to repel insects.

The polycyclic repellent materials of this invention can be applied for their intended purpose in several ways, as a solution, emulsion, aerosol fog, dust, as a concentrate in which it is prepared, or in other manner. The imide synergist can be incorporated into the polycyclic repellent material or applied separately to the surface to be treated together with the said repellent material. In this respect, however, it is preferred to admix the imide synergist and polycyclic repellent material and to treat the surface with the resulting admixture.

Solvents or carriers, which can be employed in applying synergized repellent compositions of this invention, include those which have no detrimental effect upon the repellent activity of the repellent material, i.e., which are substantially inert to the active repellent ingredient and which, when the composition is applied to live stock, is substantially non-irritating and non-toxic to the animal. Among the carrier materials which are particularly suitable, are petrolatum, deodorized kerosene, isoparaffinic hydrocarbon fraction known as Soltrol and other liquid purified hydrocarbons. Solid inert carriers, especially suitable, include talc, kieselguhr, and other inert carriers which may be used in preparing dusts. The active repellent ingredient may be applied in the form of an aqueous emulsion. Thus, the repellent, if liquid, may be emulsified directly with water, or, if desired, it may first be dissolved in a substantially water-insoluble solvent, such as one of the aforementioned solvents, and the resulting solution emulsified with water. Any suitable emulsifying agent may be employed, such as, for example, Triton X100 (alkylated aryl polyether alcohol), Tween 20 (sorbitan monolaurate polyoxyethylene derivative) and the like.

Repellent components alone or containing the synergist material in admixture therewith can be applied for the intended purpose in several ways, such as by spraying, brushing or dusting on the surface to be treated. It is preferred to spray a liquid composition on the surface to be treated. However, aerosols are employed advantageously in closed areas when application is to be made to structural surfaces rather than to animals. When admixing repellent compound with synergist, the preferred weight ratio of synergist to repellent preferably varies from 5:1 to 1:1, although ratios outside this range can be employed, as for example from 0.5:1 to 10:1. It is generally advantageous to apply a sufficient amount of the synergized repellent material to the surface to be treated so as to deposit from 0.1 to 500 grams of the synergized repellent material per 100 square feet of surface.

Several tests were made to demonstrate the synergistic effect of N-alkyl imide synergists of this invention. In one test the repellency to stable flies of 2,3,4,5-bis($\Delta^2$-butenylene) tetrahydrofurfural, 2,3,4,5-bis($\Delta^2$-butenylene)tetrahydrofurfuryl alcohol, MGK-264, and of combination of each of the first two compounds with MGK-264 was measured. This test consisted in exposing to hungry stable flies a hand covered with an organdy bag which had been impregnated with the material being tested and then aged for various lengths of time. The time to the first bite is measured. The rapidity with which the flies bite and the length of time over which the bags remain repellent give a measure of repellency. As can be seen from the results of the test, given below in Example 1 and Table I, the addition of MGK-264 extends the duration of repellency of 2,3,4,5-bis($\Delta^2$-butenylene)-tetrahydrofurfuryl alcohol from two to thirteen days.

In another test, the repellency to houseflies of 2,3,4,5-bis($\Delta^2$-butenylene)tetrahydrofurfural, of MGK-264, and of a combination of the two materials was determined by the sandwich bait method, described below. Briefly, this method consists of exposing hungry houseflies to a strip of supported dried molasses covered by a strip of porous paper previously impregnated with the repellent. The number of flies feeding on the molasses through the paper is recorded at intervals of 15 minutes. The number of flies and the rate at which the molasses is consumed gives a measure of repellency. As can be seen from the results of the test, given below in Example 2 and Table II, both 2,3,4,5-bis($\Delta^2$-butenylene)tetrahydrofurfural and MGK-264 are effective in repelling houseflies, and the activity of the combination of the two materials is greater than the additive activity of each of the ingredients.

EXAMPLE 1

Organdy bags having 100 square inches of area were impregnated with the desired amount of chemical dissolved in 6 to 7 ml. of acetone and were then suspended on a line to dry. After 24 hours, the bags were drawn over the hand and exposed to several thousand hungry stable flies *Stomoxys calcitrans* (Linn.) confined in 30-inch cubical cages. The flies were those reared according to the method of Campau, Baker, and Morrison, J. Econ. Entomology 46, 524 (1953). The time to the first bite was recorded on three successive trials. If no bite was received within five minutes, the hand covered with the organdy bag was withdrawn, and shortly thereafter reinserted into the cage for a second five minute period. This was repeated until the bag had been inserted for a total of three successive five minute periods. On following days, three additional successive tests were made. Generally the flies bite in less than a minute if they bite at all. The flies are fed each day at least 15 hours before the tests are begun.

In the table below are given the results using 2,3,4,5-bis($\Delta^2$ - butenylene)tetrahydrofurfural, 2,3,4,5 - bis($\Delta^2$ - butenylene)tetrahydrofurfuryl alcohol, MGK-264, and combinations of the last-named material with each of the other two compounds. The MGK-264, which in itself shows no repellency, extends the period of time over which the other two compounds retain their repellency.

*Table I*

| Name of Chemical | Grams of Chemical per 100 sq. in. fabric | Successive Trial Number | Seconds to First Bite—Bags Aged, Days | | | | | | | | | | | |
|---|---|---|---|---|---|---|---|---|---|---|---|---|---|---|
| | | | 1 | 2 | 3 | 4 | 6 | 7 | 8 | 9 | 10 | 11 | 12 | 13 |
| MGK-264 [1] | 1.0 | 1 | 40 | | | | | | | | | | | |
| | | 2 | 80 | | | | | | | | | | | |
| | | 3 | 5 | | | | | | | | | | | |
| Compound A [2] | 0.5 | 1 | NB | 22 | | | | | | | | | | |
| | | 2 | NB | 7 | | | | | | | | | | |
| | | 3 | NB | 12 | | | | | | | | | | |
| Mixture: | | | | | | | | | | | | | | |
| Compound A [2] | 0.5 | 1 | NB | NB | 180 | | | | | | | | | |
| MGK-264 | 0.5 | 2 | NB | NB | 27 | | | | | | | | | |
| | | 3 | NB | NB | 10 | | | | | | | | | |
| Mixture: | | | | | | | | | | | | | | |
| Compound A [2] | 0.5 | 1 | NB | NB | NB | 65 | | | | | | | | |
| MGK-264 | 1.0 | 2 | NB | NB | NB | 285 | | | | | | | | |
| | | 3 | NB | NB | NB | 202 | | | | | | | | |
| Compound B [3] | 0.5 | 1 | NB | NB | 270 | | | | | | | | | |
| | | 2 | NB | NB | 210 | | | | | | | | | |
| | | 3 | NB | NB | 290 | | | | | | | | | |
| Mixture: | | | | | | | | | | | | | | |
| Compound B [3] | 0.5 | 1 | NB | NB | NB | NB | NB | NB | NB | NB | NB | NB | NB | [4] 65 |
| MGK-264 | 0.5 | 2 | NB | NB | NB | NB | NB | NB | NB | NB | NB | NB | NB | [4] NB |
| | | 3 | NB | NB | NB | NB | [1] NB | NB | NB | NB | NB | NB | NB | [4] NB |

NB=No bites.
[1] N-octyl bicyclo [2.2.1]-5-heptene-2,3-dicarboximide, McLaughlin Gormley King Co.
[2] 2,3,4,5-bis($\Delta^2$-butenylene)tetrahydrofurfural.
[3] 2,3,4,5-bis($\Delta^2$-butenylene)tetrahydrofurfuryl alcohol.
[4] Tests discontinued due to death of flies, presumably of old age.

EXAMPLE 2

A modification of the sandwich bait method described by L. B. Kilgore in Soap, June 1939, was employed in the repellency tests of this example. Following is a description of the technique employed. On a cardboard backing about 2½ x 4 inches, two strips of unsulfured molasses about ⅜ inch wide by 3½ inches long are applied, leaving a margin of at least ¼ inch on all sides of each strip. Over these strips are applied porous strips 1 x 4 inches in size, impregnated with the repellents being tested, these strips being held in place by stapling to the cardboard backing at each end.

Highly porous paper strips were impregnated with 2,3,4,5-bis(Δ²-butenylene)tetrahydrofurfural, with MGK–264, and with a combination of these two materials. Impregnation of the porous strips was effected by immersing them in an acetone solution of the compound, and then allowing the strip to dry over a period of from 4 to 6 hours. The loose fiber construction of the impregnated paper permits the fly to remove the molasses through it.

The prepared strips, i.e., the sandwich bait, were then exposed to about 150 houseflies (*Musca domestica*), over 5 days old, which had been starved for 6 hours. Counts of the number of flies feeding on the strips were taken at intervals of 15 minutes. The number of flies and the rate at which the molasses is consumed give a good measure of repellency. A nonrepellent material in the sandwich bait becomes black with flies soon after being exposed and the bait will often be entirely consumed in 5 minutes.

The results, given below in Table II, show that 2,3,4,5-bis(Δ²-butenylene)tetrahydrofurfural and MGK–264 each show some repellency to houseflies, and that the combination of the compounds shows a greater repellency than the additive activity of each of the ingredients.

repellent compositions so produced, have been provided, as described.

We claim:

1. An insect repellent containing as an essential active ingredient a polycyclic repellent compound selected from the group consisting of 2,3,4,5-bis(Δ²-butenylene)tetrahydrofurfuryl alcohol and 2,3,4,5-bis(Δ²-butenylene)tetrahydrofurfural together with a synergistic amount of N-octyl bicyclo[2.2.1]-5-heptene-2,3-dicarboximide, wherein the ratio of said N-octyl bicyclo[2.2.1]-5-heptene-2,3-dicarboximide to said polycyclic repellent compound is in the range of 0.5:1 to 10:1 parts by weight.

2. An insect repellent containing as an essential active ingredient 2,3,4,5-bis(Δ²-butenylene)tetrahydrofurfural together with a synergistic amount of N-octyl bicyclo[2.2.1]-5-heptene-2,3-dicarboximide, wherein the ratio of said N-octyl bicyclo[2.2.1]-5-heptene-2,3-dicarboximide to said 2,3,4,5-bis(Δ²-butenylene)tetrahydrofurfural is in the range of 0.5:1 to 10:1 parts by weight.

3. An insect repellent containing as an essential active ingredient 2,3,4,5-bis(Δ²-butenylene)tetrahydrofurfuryl alcohol together with a synergistic amount of N-octyl bicyclo[2.2.1]-5-heptene-2,3-dicarboximide, wherein the ratio of said N-octyl bicyclo[2.2.1]-5-heptene-2,3-dicarboximide to said 2,3,4,5-bis(Δ²-butenylene)tetrahydrofurfuryl alcohol is in the range of 0.5:1 to 10:1 parts by weight.

4. A method for repelling insects comprising applying to a surface from which insects are to be repelled, a repellent defined in claim 1.

5. The method of claim 4 wherein the weight ratio of said imide to said polycyclic repellent compound is within the range of about 0.5:1 to 10:1, and wherein a Table II

| Compound | Concentration of Dipping Solution, Wt. Percent | Number of Flies Feeding, Minutes | | | | | | | | | | | | |
|---|---|---|---|---|---|---|---|---|---|---|---|---|---|---|
| | | 5 | 15 | 30 | 45 | 60 | 75 | 90 | 105 | 120 | 135 | 150 | 165 | overnight |
| 2,3,4,5-bis(Δ²-butenylene)-tetrahydrofurfural | 2 | 0 | 0 | 25 | 31 | 16 | 20 | gone [1] | | | | | | |
| MGK–264 [2] | 2 | 1 | 0 | 1 | 28 | 11 | gone [1] | | | | | | | |
| Mixture: | | | | | | | | | | | | | | |
| 2,3,4,5-bis(Δ²-butenylene)-tetrahydrofurfural | 1 | 0 | 0 | 0 | 5 | 18 | 22 | 5 | gone [1] | | | | | |
| MGK–264 | 1 | | | | | | | | | | | | | |

[1] Molasses completely consumed.
[2] N-octyl bicyclo [2.2.1]-5-heptene-2,3-dicarboximide, McLaughlin Gormley King Co.

Reasonable variation and modification are possible within the scope of the foregoing disclosure and the appended claims to the invention, the essence of which is that N-alkyl imides of bicyclo[2.2.1]-5-heptene-2,3-dicarboxylic acid have been found to synergize insect repellent activity of 2,3,4,5-bis(Δ²-butenylene)tetrahydrofurfural, 2,3,4,5-bis(butylene)tetrahydrofurfural, 2,3,4,5-bis(Δ²-butenylene)tetrahydrofurfuryl alcohol, and 2,3,4,5-bis(butylene)tetrahydrofurfuryl alcohol and certain alkyl derivatives thereof and that, therefore, a method for synergizing activity of these repellent materials, a method for repelling insects employing resulting synergized repellents and quantity of synergized insect repellent is applied sufficient to deposit from 0.1 to 500 grams of said syngerized repellent per 100 square feet of surface.

References Cited in the file of this patent

UNITED STATES PATENTS

| 2,424,220 | Bousquet | July 22, 1947 |
| 2,572,577 | Tissol | Oct. 23, 1951 |

OTHER REFERENCES

Hartzell: Contrib. fr. Boyce Thompson Inst., vol. 15 (1949), pp. 337–339.